(12) United States Patent
Högberg et al.

(10) Patent No.: US 10,088,024 B2
(45) Date of Patent: Oct. 2, 2018

(54) LINEAR ELECTRO-MECHANICAL ACTUATOR

(71) Applicants: Pär Högberg, Göteborg (SE); Mikael Brage, Mölnlycke (SE)

(72) Inventors: Pär Högberg, Göteborg (SE); Mikael Brage, Mölnlycke (SE)

(73) Assignee: AKTIEBOLAGET SKF, Gothenburg (SE)

( * ) Notice: Subject to any disclaimer, the term of this patent is extended or adjusted under 35 U.S.C. 154(b) by 203 days.

(21) Appl. No.: 15/038,358

(22) PCT Filed: Nov. 14, 2014

(86) PCT No.: PCT/SE2014/015352
§ 371 (c)(1),
(2) Date: May 20, 2016

(65) Prior Publication Data
US 2016/0356367 A1 Dec. 8, 2016

(51) Int. Cl.
| | | |
|---|---|---|
| *F16H 25/20* | (2006.01) | |
| *H02K 7/116* | (2006.01) | |
| *H02K 7/06* | (2006.01) | |
| *F16H 57/04* | (2010.01) | |
| *F16C 41/00* | (2006.01) | |

(52) U.S. Cl.
CPC ........... *F16H 25/20* (2013.01); *F16C 41/004* (2013.01); *F16H 57/0406* (2013.01); *F16H 57/0497* (2013.01); *H02K 7/06* (2013.01); *H02K 7/1166* (2013.01); *F16H 2025/209* (2013.01);
(Continued)

(58) Field of Classification Search
CPC . H02K 7/06; H02K 7/11; H02K 7/116; H02K 7/1166; H02K 11/21; H02K 11/215; F16H 57/04; F16H 57/04; F16H 57/0406; F16H 57/049; F16H 57/0497; F16H 25/20; F16H 25/12; F16H 25/2204;
(Continued)

(56) References Cited

U.S. PATENT DOCUMENTS

| | | | | |
|---|---|---|---|---|
| 4,137,784 A | * | 2/1979 | Griffin | ...................... B66F 3/08 254/103 |
| 5,906,136 A | * | 5/1999 | Yabe | ................... F16C 33/3713 277/562 |

(Continued)

*Primary Examiner* — Tran Nguyen
(74) *Attorney, Agent, or Firm* — Bryan Peckjian; SFK USA Inc. Patent Dept.

(57) ABSTRACT

The present invention relates to a linear electro-mechanical actuator for transferring a rotational motion to a linear motion. The actuator provides a piston being at least partly arranged inside a housing. The actuator further provides a transmission module including a rotating portion having a load-carrying surface and a non-rotating portion being operatively engageable to each other. The transmission module is adapted to transfer a rotational motion of the rotating portion to a linear motion of the piston via the non-rotating portion. The actuator further provides a lubricating member having a porous polymeric matrix and a lubricating material, the load-carrying member being arranged adjacent to the transmission module. Thereby, the actuator allows for lubrication of at least a portion of the load-carrying surface of the rotating portion upon movement of the rotating portion. The linear electro-mechanical actuator may not require, or may at least minimize, the need of relubrication.

11 Claims, 3 Drawing Sheets

(52) U.S. Cl.
CPC ................ *F16H 2025/2062* (2013.01); *F16H 2025/2084* (2013.01)

(58) Field of Classification Search
CPC ................ F16H 25/2418; F16C 41/004; F16C 33/3713; B66F 3/08; B66F 3/44
See application file for complete search history.

(56) References Cited

U.S. PATENT DOCUMENTS

| | | |
|---|---|---|
| 7,278,333 B2 | 10/2007 | Kato et al. |
| 2006/0088430 A1 | 4/2006 | Sakurai et al. |
| 2009/0308187 A1* | 12/2009 | Schmid ............... F16H 25/2418 74/89.4 |
| 2011/0089879 A1 | 4/2011 | Duits |
| 2013/0112022 A1* | 5/2013 | Shimizu ................ F16H 25/20 74/89.34 |

\* cited by examiner

LINEAR ELECTRO-MECHANICAL ACTUATOR

CROSS-REFERENCE

This application is the U.S. National Stage of International Application No. PCT/SE2014/051352 filed on Nov. 14, 2014, which claims the benefit of priority from Swedish Patent Application No. 1300731-5 filed on Nov. 25, 2013, the contents of which are both herein incorporated by reference in their entirety.

TECHNICAL FIELD OF INVENTION

The present invention relates to a linear electro-mechanical actuator for transferring a rotational motion to a linear motion. The linear electro-mechanical actuator comprises a piston, a housing, a transmission module and a lubricating member.

BACKGROUND

Linear actuators are used to move an object along a straight line, either between two end points or to a defined position. Linear electro-mechanical actuators typically incorporate a rotating electrical motor and some kind of mechanical transmission module to convert the relatively high-speed rotation of the motor to a low speed linear motion. This transmission module may incorporate a gear box and/or a screw shaft.

Linear electro-mechanical actuators are constructed to perform many thousands to hundreds of thousands, or more, strokes (i.e. movements of the object along the straight line) over relatively long travel distances. Upon use, surfaces of the linear actuators are thus subjected to stressing loads, such as rotational, radial and/or axial forces, which may throw off and/or scrape off lubricants being applied to these surfaces. Consequently, these surfaces require continuous relubrication in order to ensure a long service life of the linear actuators.

Today, relubrication is a troublesome operation and often large amounts of lubricants are wasted due to unprecise application with regard to both the location in the actuator and the amount of lubricants applied. Hence, there is a need in the art for more efficient lubrication of linear electro-mechanical actuators.

SUMMARY OF THE INVENTION

In a linear electro-mechanical actuator, a transmission module comprising a rotating portion and a non-rotating portion being operatively engageable to each other is generally arranged. Typically, the non-rotating portion is operatively connected to a proximal end of a piston, while the rotating portion is operatively connected to an electrical motor generating a rotational motion to the rotating portion. The transmission module may transfer a rotational motion of the rotating portion to a linear motion of the piston in an axial direction via the non-rotating portion.

The rotational motion of the rotating portion typically has a speed of about a couple of hundred revolutions per minute or more. The relatively high speed implies that lubricants arranged on the transmission module, e.g. the rotating portion, are thrown off by centripetal forces. The striking linear motion in the axial direction implies that lubricants also are scraped off. Thus, an initial lubrication of an actuator generally has a limited service life and is highly dependent on the speed used and the forces applied.

Thus, the service life and performance of the transmission module is dependent on proper lubrication, and regular relubrication is required in conventional linear electro-mechanical actuators. However, such relubrication is typically complicated due to e.g. the design of the actuator in general and of the transmission module in particular.

The present invention serves to overcome at least some of the problems known in the prior art by providing a linear electro-mechanical actuator which is capable of improving the application of the lubrication in terms of precision and functionality, while providing a useful amount of a lubricating material. The linear electro-mechanical actuator according to the present invention may not require or may at least minimize the need of relubrication.

According to a first aspect of the invention, a linear electro-mechanical actuator for transferring a rotational motion to a linear motion is provided. The linear electro-mechanical actuator comprises a piston having a distal end and a proximal end. The piston extends in an axial direction. The piston is at least partly arranged inside a housing and moveable relative to the housing in the axial direction. The housing defines an inner milieu. The linear electro-mechanical actuator further comprises a transmission module comprising a rotating portion and a non-rotating portion being operatively engageable to each other. The rotating portion has a load-carrying surface. The non-rotating portion is operatively connected to the proximal end of the piston and the rotating portion is adapted to be operatively connected to a motor. The transmission module is adapted to transfer a rotational motion of the rotating portion generated by the motor to a linear motion of the piston in the axial direction via the non-rotating portion. The linear electro-mechanical actuator further comprises a lubricating member comprising a porous polymeric matrix and a lubricating material. The lubricating member is present in the inner milieu. The lubricating member is moveable to the rotating portion and rotationally locked to the non-rotating portion in an axial direction. The lubricating member is arranged adjacent to the transmission module. Thereby, the actuator allows for lubrication of at least a portion of the outer load-carrying outer surface of the rotating portion by the lubricating material upon movement of the rotating portion.

Advantages of the linear electro-mechanical actuator according to the present invention, will be described in more detail throughout the application text, and are also summarized below:

- The linear electro-mechanical actuator may be easily assembled in a dry state of the lubricating member, i.e. with no smeary grease, or other form of liquid or semi-liquid lubricating material, present except in the porous polymeric matrix of the lubricating member.
- The linear electro-mechanical actuator may allow for a precise arrangement of the lubricating member, having a predetermined size and shape, at a location in the actuator where it is needed the most, i.e. adjacent to load-carrying surfaces subjected to harsh loads upon use of the actuator.
- The linear electro-mechanical actuator may allow for less maintenance than required for a conventional actuator due to no need of relubrication during its service life as well as due to less wear of the components of the actuator. Further, heat built up due to excess lubrication in an initial state and after each relubrication may be prevented and/or avoided.

The linear electro-mechanical actuator may easily be used due to a relatively controlled consumption of lubricating material causing substantially no leakage of lubricating material as well as due to its tolerance to e.g. washing.

The linear electro-mechanical actuator may have an improved dwell and stock time due to a high stability of the lubricating member leading to less problems with e.g. oil separation.

The linear electro-mechanical actuator may have a predictable service life due to a known amount of lubricating material in the lubricating member as well as due to a known location of the lubricating member in the actuator.

The linear electro-mechanical actuator may allow for environmentally friendly handling of the lubricating member including the unconsumed lubricating material at end of service life, in particular when provided as a separate member.

In an embodiment, the actuator allows for lubrication of substantially the entire load-carrying surface of rotating portion by the lubricating material upon movement of the rotating portion. By the term "substantially" is herein meant at least 90% of the load-carrying surface of the rotating portion, such as at least 95% of the load-carrying surface of the rotating portion.

By the term "piston" is herein meant the moveable, typically striking, component of the actuator performing a linear motion in the axial direction. The piston may extend from the inner milieu into the outer milieu and may retract from the outer milieu into the inner milieu upon use of the actuator. In a fully retracted state, the piston is mainly, typically entirely, arranged in the inner milieu. In a fully extended state, the piston is mainly, typically entirely, arranged in the outer milieu. The piston may sometimes be referred to as an extension member, e.g. an extension tube, of the linear electro-mechanical actuator. The piston typically has, but is not limited to, the general shape of a circular cylinder. The piston may be solid or hollow. Typically, the piston is at least partially hollow. The piston may be metallic. For instance, the piston may be made of steel, e.g. stainless steel.

The "axial direction" refers to the direction of the central axis of the piston, which is typically also the direction of the central axis of the rotating portion. The "radial direction" refers to the direction of the radius of the piston, which is typically also the direction of the radius of the rotating portion.

By the term "lubricating member" is herein meant a member comprising a porous polymeric matrix and a lubricating material. The lubricating member is a component of the actuator serving to lubricate a load-carrying surface or load-carrying surfaces of the actuator. Such a load-carrying surface may be the outer surface of the rotating portion, and/or a portion of the non-rotating portion facing the rotating portion. The lubricating member is arranged adjacent to the transmission module. The lubricating member may be moveable to the rotating portion and rotationally locked to the non-rotating portion as seen in an axial direction. Typically, the lubricating member is arranged adjacent to, hence at a minor distance from, the non-rotating portion of the transmission module. The lubricating member may be at least partly recessed into a recess of the non-rotating portion, the recess being adapted to receive at least a portion of the lubricating member.

A load-carrying surface, e.g. the outer surface of the rotating portion, moving, such as sliding, against the lubricating member may be provided with an even and consistent film of the lubricating material. A moderate increase in temperature, which may occur upon use of the actuator, may cause the lubricating material to be pushed towards the surface of the polymeric matrix, as the thermal expansion of the lubricating material typically is greater than that of the polymeric matrix. The viscosity of the lubricating material typically decreases with increasing temperature. When the actuator stops working, the polymeric matrix may reabsorb excess lubricating material.

Typically, the porous polymeric matrix is saturated with the lubricating material. The lubricating member may comprise about 50-80%, such as 65-75%, e.g. 70%, by weight of the lubricating material. The lubricating material may for instance be a lubricating oil, such as a high quality synthetic oil, a very high quality synthetic oil, or other fluid lubricant of ample viscosity.

The polymeric matrix has a porous structure. Typically, the porous structure comprises millions of pores, e.g. micropores. Each pore has a size such small that they may hold the lubricating material by surface tension. The porous polymeric matrix may be a polymer matrix, such as a microporous polymer matrix, e.g. a polyethylene matrix. Typically, the porous polymeric matrix is moulded.

Due to the porosity of the polymeric matrix, the lubricating member has a relatively low strength and substantially no bearing capacity. Generally, the lubricating member is not load-carrying, since too much friction and/or heat would obstruct the pores of the lubricating member.

The lubricating member has predictable properties, such as a pre-determined volume and a known content of lubricating material, and thereby also a predictable service life. The predictable nature of the lubricating member prevents and avoids the actuator from relubrication. The size, i.e. the volume, may be adapted to correspond to the lubrication needs of the actuator. The level of saturation of lubricating material within the lubricating member may be adapted to correspond to the lubrication needs of the actuator.

The lubricating member has an advantage in that it remains firm in shape over its service life. A lubricating member according to the present invention is easy to apply to the linear electro-mechanical actuator, e.g. due to its non-smeary nature. Sometimes, the lubricating member is referred to as a solid oil.

The lubricating member may allow for a service life of the actuator device being increased with at least one order of magnitude expressed in strokes before breakage compared to conventional actuator devices using conventional lubricants, such as oil, grease etc.

The lubricating member may allow for an improved stocking and dwell time. The lubricating member keeps lubricating material, typically a lubricating oil, bonded better than e.g. soap in grease, and hence lessens the problem with oil separation over time.

The lubricating member has a good initial lubrication and allows for dry assembly. The lubricating member is relatively insensitive to dirt, cleaning and changes in temperature. For instance, the lubricating member may withstand temperatures within the range of from −40° C. to +85° C.

In the present invention, the lubricating member is arranged in close proximity to the surface(s) of the linear electro-mechanical actuator being subjected to harsh loads upon use of the actuator. The lubricating material of the lubricating member gradually migrates to the load-carrying surface(s).

Typically, the lubricating member is arranged such it allows for lubrication of a least a portion, either in the axial direction or the radial direction, of the load-carrying surface(s) by the lubricating material. For instance, the lubricating member may lubricate the entire periphery of a cross-section of the load-carrying surface(s). Advantageously, the lubricating member is arranged such it allows for lubrication of the entire load-carrying surface(s) by the lubricating material. For instance, the lubricating member lubricates the entire load-carrying surface of the rotating portion, and may thus lubricate the load-carrying surface of the rotating portion over the long travel distance of the rotating portion.

In an embodiment, the lubricating member is a separate component of the linear actuator. By being a separate component of the actuator, the lubricating member may easily be removed as a solid part (excluding the small amount of lubricating material that may gradually migrate to the surface(s) being subjected to a load upon use of the actuator) and be recycled at the end of life of the actuator. A lubricating member being provided as a separate component differs from e.g. a surface treatment layer or a surface treatment composition provided on the load-carrying surface of the rotating portion.

Alternatively, the lubricating member may be an integrated component of the actuator. For instance, the lubricating member may be fixedly attached to the non-rotating portion.

The lubricating member may have a shape suitable for its intended use. In an embodiment, the lubricating member has the shape of a bushing. A bushing may easily be arranged around the transmission module, such as about the rotating portion, and may also easily be separated therefrom. In such an arrangement, the lubricating member may surround the entire periphery of a cross-section of e.g. the rotating portion.

Alternatively, the lubricating member being provided as a separate component may have the shape of at least three separate points or separate flanges. In such an arrangement, the lubricating member typically does not surround the entire periphery of a cross-section of the transmission module, such as the rotating portion, but a portion of the periphery of a cross-section of e.g. the rotating portion.

Typically, the lubricating member has a shape complementary to the shape of the transmission module. For instance, a lubricating member in the shape of a bushing having a screw profile and being arranged adjacent to a nut is a successful arrangement for continuous lubrication of the load-carrying surface(s) of a transmission module consisting of a screw and a nut. The lubricating member could be adapted to either a sliding transmission module having a profile such as ACME, or to a rolling transmission module comprising rolling elements, e.g. a ball nut or a roller nut.

The lubricating member may float axially relative to the rotating portion, e.g. a screw, in order to not be load-carrying itself, and the lubricating member may be fixed relative to the non-rotating portion, e.g. a nut, in order to follow its movement in the axial direction.

The lubricating member may comprise an amount of lubricating material proportional to the needs of the electromechanical actuator during its entire service life. Thus, the amount of lubricating material in the lubricating member may be optimized both economically and environmentally based on the expected service life of the actuator.

By the term "transmission module" is herein meant the module of components of the actuator being adapted to transfer a rotational motion generated by a motor to a linear motion of the piston in the axial direction.

The transmission module may comprise a rotating portion and a non-rotating portion being operatively engageable to each other. The rotating portion may have a load-carrying surface and may be adapted to be operatively connected to a motor. The non-rotating portion may be operatively connected to a proximal end of a piston. The transmission module may be adapted to transfer a rotational motion of the rotating portion generated by the motor to a linear motion of the piston in the axial direction via the non-rotating portion.

In an embodiment, the rotating portion is a screw and the non-rotating portion is a nut. When the rotating portion is a screw, it typically has a threaded outer load-carrying surface.

In another embodiment, the rotating portion is a nut and the non-rotating portion is a screw. When the rotating portion is a nut, it typically has a threaded inner load-carrying surface.

One common type of linear actuators incorporates a screw shaft with a nut running thereon. The screw shaft extends over the full length of the actuator and sets the operating length of the actuator. Since the nut is held in a non-rotatable state, the nut will be displaced when the screw shaft is rotated by the motor. The nut may incorporate rolling elements, such as balls or rollers, between the screw shaft and the nut. This will allow for a high-efficiency linear actuator with high load transfer and long service life. The nut may also engage directly with the screw shaft, i.e. a sliding screw design. In this case, the nut is preferably made of a plastic material.

In an embodiment, the screw is selected from the group consisting of: a sliding screw, a roller screw or a boll roller screw. In an embodiment, the nut is selected from the group consisting of: a torotionally locket nut, such as a sliding nut, or a nut comprising rolling elements, such as a ball nut or a roller nut. Generally, the nut is complementary to the screw.

The transmission module may comprise a screw having a threaded outer surface, and a nut having a threaded inner surface, wherein the screw and the nut are engageable to each other. The threading of the screw and the threading of the nut typically has the same pitch. In this example, the nut is typically operatively connected to the proximal end of the piston.

By the term "separating member" is herein meant a component of the actuator being arranged at the interface between the inner milieu and the outer milieu or at least close to this interface. One function of the separating member is to separate the inner milieu from the outer milieu in, or close to, the opening of the housing adapted to receive the distal end of the piston.

The separating member is typically arranged in between the piston and the housing as seen in a radial direction. The separating member may surround either the entire periphery of a cross-section of the piston or a portion thereof. The separating member may be arranged about the piston. The separating member is typically adapted to receive the distal end of the piston.

In an embodiment, the linear electro-mechanical actuator further comprises a separating member. The separating member may be arranged adjacent to an opening of the housing and in between the piston and the housing in a radial direction. The opening of the housing may be adapted to receive the distal end of the piston. The separating member may be arranged such that it surrounds the entire periphery of a cross-section of the piston which forms a portion of the outer load-carrying surface of the piston.

The separating member may be a scraper. A scraper is typically adapted to clean the outer load-carrying surface of the piston from dirt and dust soiling the surface of the piston while it retracts into the inner milieu from the outer milieu. Thus, the scraper serves to preserve a relatively clean inner milieu of the actuator. The scraper is typically made in moulded plastics. The scraper may be arranged about the piston.

The separating member may be a sealing member. A sealing member is typically adapted to seal the interface between the outer load-carrying surface of the piston and the housing in the radial direction. Thus, the sealing member serves to seal the opening between the inner milieu and the outer milieu in order to prevent leakages. The sealing member is typically made in moulded plastics. The sealing member may be arranged about the piston.

Both a scraper and a sealing member may be present in the linear electro-mechanical actuator. In an example embodiment, the actuator comprises a first separating member being a scraper and a second separating member being a sealing member. The scraper may be arranged relatively closer to the outer load-carrying surface of the piston. The sealing member may be arranged to seal the opening present in the radial direction between the scraper and the housing.

By the term "load-carrying member" is herein meant a component of the linear electro-mechanical actuator serving to support and guide the piston over its, often relatively long, travel distance relative to the housing. The load-carrying member is generally arranged in the inner milieu of the actuator formed by the housing (i.e in the inner milieu of the housing). The load-carrying member may be arranged between the piston and the housing as seen in the radial direction. The load-carrying member generally has an inner load-carrying surface facing the outer surface of the piston.

In an embodiment, the linear electro-mechanical actuator further comprises a load-carrying member. The load-carrying member may be arranged in between the piston and the housing in the radial direction. The load-carrying member may be arranged such that it surrounds the entire periphery of a cross-section of the piston which forms a portion of the outer load-carrying surface of the piston. The load-carrying member may be arranged about the piston. The load-carrying member may have the shape of a sleeve or a bushing.

The load-carrying member may be a guiding member. The guiding member may have the shape of a bushing or a sleeve, thereby generally surrounding the entire periphery of a cross-section of the piston. However, the guiding member does not necessarily have to surround the entire periphery of a cross-section of the piston, but may for instance consist of three separate points or flanges. The guiding member may be a linear guiding member. For instance, the guiding member may be a perforated sheet.

The guiding member may be an integrated part of the actuator, e.g. an integrated part of the housing. Alternatively, the guiding member may be a separate component of the actuator.

By the term "housing" is herein meant the component of the actuator defining the inner milieu and serving to protect the components arranged therein. The housing is generally stationary in relation to the moveable piston. The housing may sometimes be referred to as a protection member, e.g. a protection tube, of the linear electro-mechanical actuator. The housing may be cylindrical or tubular. Typically, the housing has the shape of a hollow circular cylinder.

In an embodiment, the housing has the shape of a cylinder, such as a circular cylinder. The housing may be metallic. For instance, the housing may be made of steel, e.g. stainless steel. The transmission module is typically arranged inside the housing, in the inner milieu of the actuator.

Generally, a linear electro-mechanical actuator further comprises, or is connected to, a motor, such as an electrical motor. The electrical motor may generate a rotational motion of the transmission module. The motor may comprise a motor element, which may be fixedly attached to the housing, and a rotor element, which may be fixedly attached to the transmission module.

Further features of, and advantages with, the present invention will become apparent when studying the appended claims and the following description. The skilled addressee realize that different features of the present invention may be combined to create embodiments other than those described in the following, without departing from the scope of the present invention.

BRIEF DESCRIPTION OF THE DRAWINGS

These and other aspects of the present invention will now be described in more detail, with reference to the appended drawings showing embodiments of the invention.

DETAILED DESCRIPTION OF THE INVENTION

The present invention will now be described more fully hereinafter with reference to the accompanying drawings, in which currently preferred embodiments of the invention are shown. This invention may, however, be embodied in many different forms and should not be construed as limited to the embodiments set forth herein; rather, these embodiments are provided for thoroughness and completeness, and fully convey the scope of the invention to the skilled person.

Figure 1:
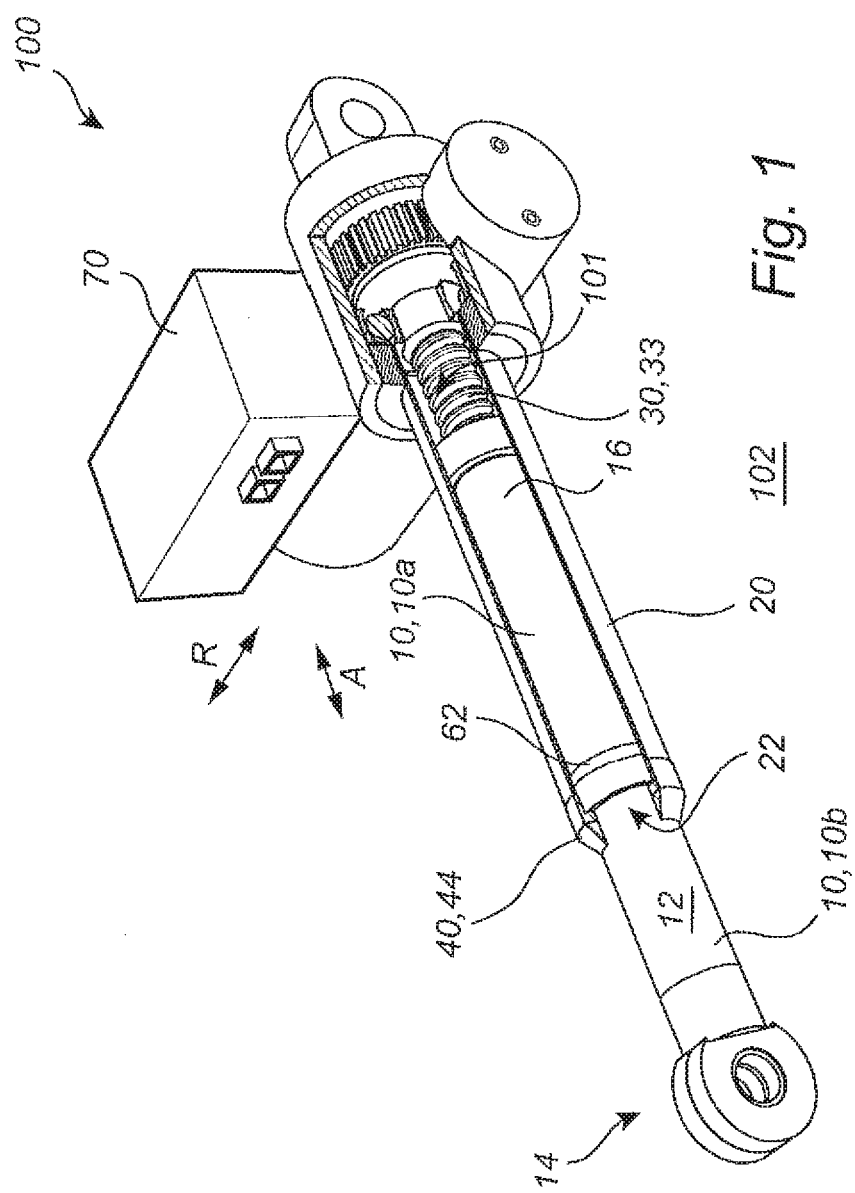
In FIG. 1, a linear electro-mechanical actuator according to an example embodiment of the present invention is schematically shown in a perspective view.

The present invention relates to a linear electro-mechanical actuator 100 for transferring a rotational motion to a linear motion, which is schematically shown in FIG. 1. It should be readily appreciated that the linear electro-mechanical actuator may sometimes be denoted as the linear actuator or the actuator for the sake of simplicity. The actuator comprises a piston 10, a housing 20 and a transmission module 30. In FIG. 1, the example embodiment of the actuator here further comprises a separating member 40, a load-carrying member 60 such as a guiding member 62 and a motor 70. Throughout this description, the piston extends in the axial direction A and in the radial direction R. The linear electro-mechanical actuator further comprises a lubricating member (not shown in FIG. 1) described in more detail below.

The piston 10 has a distal end 14 and a proximal end 16. The piston 10 extends in an axial direction A and has an outer load-carrying surface 12. The piston 10 is moveable relative to the housing 20 in the axial direction A. The housing 20 has an opening 22 being adapted to receive the distal end 14 of the piston 10. The housing 20 defines an inner milieu 101. Here, the housing 20 has the shape of a circular cylinder.

As shown in FIG. 1, the piston 10 is at least partly arranged inside the housing 20. The part of the piston 10a being arranged inside the housing is arranged in the inner milieu 101. The part of the piston 10b extending outside the housing is arranged in the outer milieu 102. In a fully retracted state, the piston 10 is mainly, such as entirely, arranged in the inner milieu 101. In a fully extended state, the piston 10 is mainly, such as entirely, arranged in the outer milieu 102. In FIG. 1, the piston is in a partly extended state.

The transmission module 30 is operatively connected to the proximal end of the piston 10 and adapted to transfer a rotational motion generated by the motor 70 to a linear motion of the piston 10 in the axial direction A. The transmission module 30 is arranged inside the housing 20 in the inner milieu 101 of the actuator 100.

Although not strictly required, the transmission module 30 here comprises a rotatable screw 33 with a non-rotatable nut (not shown) running thereon. The screw extends over the full length of the actuator and sets the operating length of the actuator. The nut is held in a non-rotatable state, and is displaced when the screw shaft is rotated by the motor 70. The transmission module 30 is at least partly arranged inside the piston 10.

As mentioned above, the linear actuator may typically, but not strictly necessarily, include a separating member. The separating member 40 is arranged adjacent the opening of the housing 20 and in between the piston 10 and the housing 20 as seen in a radial direction R.

The separating member 40, herein shown as a scraper 44, separates the inner milieu 101 from the outer milieu 102 at an opening 22 of the housing adapted to receive the distal end 14 of the piston. The scraper 44 further serves to clean the outer surface 12 of the piston when retracting from the outer milieu 102 into the inner milieu 101.

As mentioned above, the linear actuator may typically, but not strictly necessarily, include a load-carrying member such as a guiding member. In the example embodiment shown in FIG. 1, the guiding member 62 here is arranged in the inner milieu in between the piston and the housing as seen in the radial direction R. The guiding member 62 may be arranged either closer to the proximal end of the piston or closer to the distal end of the piston. In FIG. 1, the guiding member is arranged rather in the centre part of the piston. The guiding member serves to keep the piston 10 on track during its linear movements in the axial direction A. In particular, the guiding member serves to guide the piston such that it travels efficiently as it moves in the axial direction relative the housing.

Figure 2:
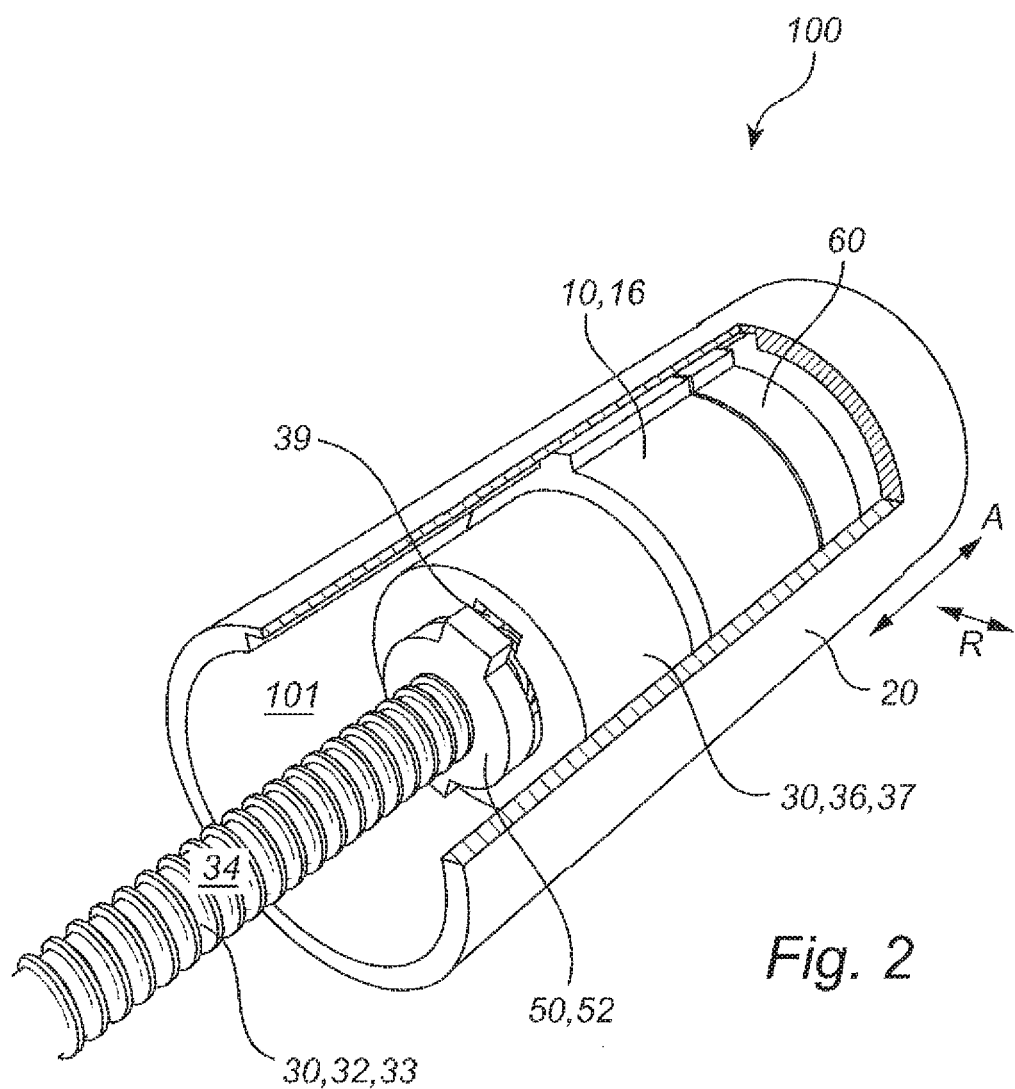
In FIG. 2, a portion of a linear electro-mechanical actuator according to an example embodiment of the present invention is schematically shown in a perspective view and in an assembled state.
Figure 3:
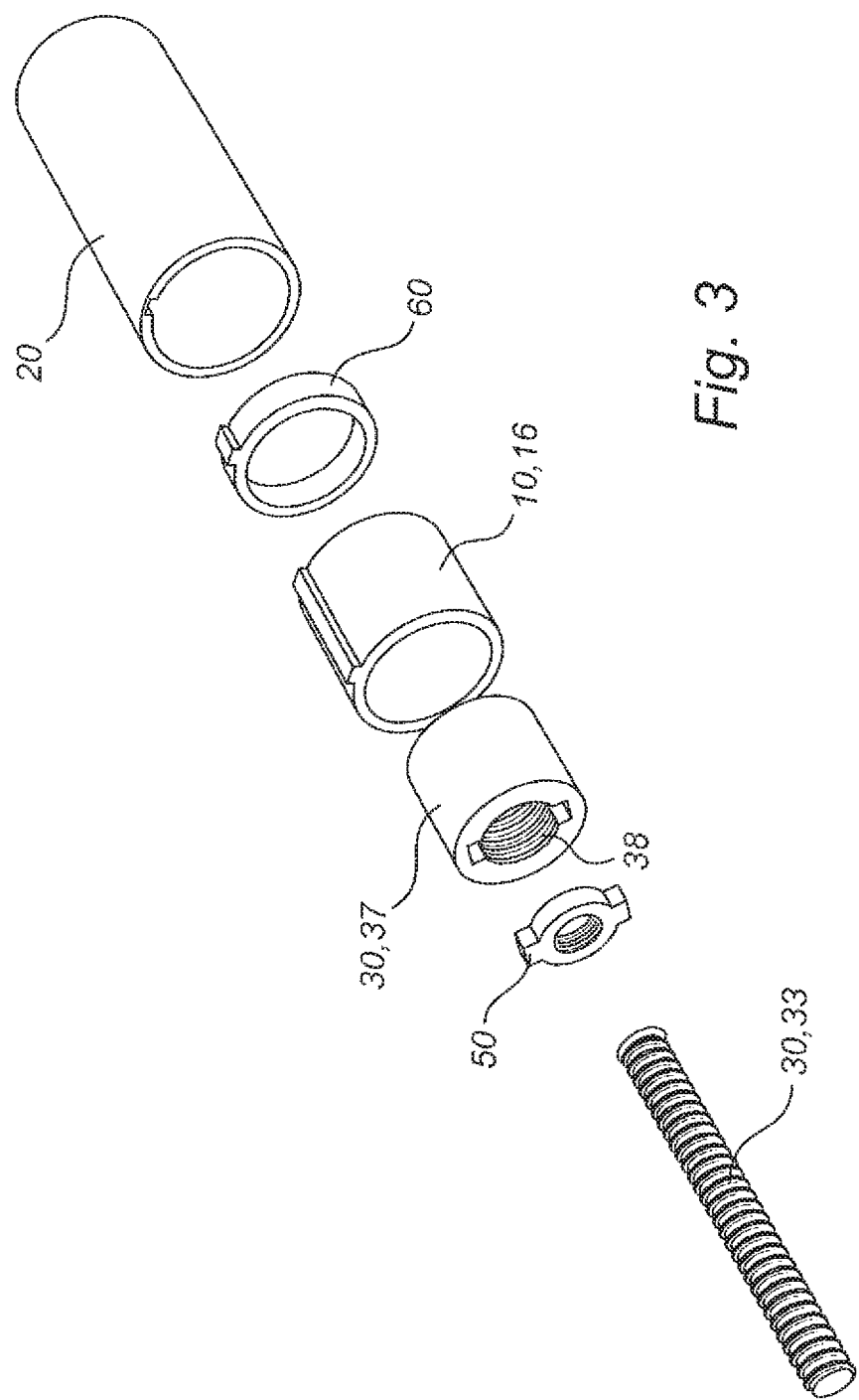
In FIG. 3, a portion of a linear electro-mechanical actuator according to an example embodiment of the present invention is schematically shown in an exploded view.

In FIGS. 2 and 3, a portion of the linear electro-mechanical actuator 100 in FIG. 1 is shown in more detail, namely, the lubricating member 50 and its surroundings. FIG. 2 shows the lubricating member 50 and its surroundings in an assembled state, while FIG. 3 is an exploded view of the lubricating member 50 and its surroundings. All features of the actuator 100 are not explicitly shown in either or both of FIGS. 2-3.

The piston 10 having a distal end (not shown) and a proximal end 16 extends in the axial direction A. The proximal end 16 is arranged inside the housing 20, and, thus, in the inner milieu 101.

The transmission module 30 is also arranged inside the housing 20, thus, in the inner milieu 101 of the actuator. The transmission module 30 comprises a rotating portion 32 and a non-rotating portion 36 being operatively engageable to each other. The rotating portion 32 has here an outer load-carrying surface, which here is threaded (34 in FIG. 2). The non-rotating portion 36 has here an inner threaded surface (38 in FIG. 3). The non-rotating portion 36 is operatively connected to the proximal end 16 of the piston 10 and the rotating portion 32 is operatively connected to a motor (not shown in FIGS. 2-3). The transmission module 30 is adapted to transfer a rotational motion of the rotating portion 32 generated by the motor to a linear motion of the piston 10 in the axial direction A via the non-rotating portion 36.

In FIGS. 2-3, the proximal end 16 of the piston is operatively connected to the non-rotating portion 36, herein shown as a nut 37. The nut 37 is operatively engageable with the rotating portion 32, herein shown as a screw 33. However, it should be readily appreciated that in all of the embodiments of the present invention, the transmission module may not necessarily consists of a screw and a nut. Further, it should also be readily appreciated that in alternative embodiments, the non-rotating portion may be the screw and the rotating portion may be the nut.

As illustrated in FIG. 2, the lubricating member 50 is present inside the housing 20, thus, in the inner milieu 101 of the actuator 100. The lubricating member 50 is arranged adjacent to the transmission module 30, and more specifically adjacent to the non-rotating portion 36, herein the nut 37. Preferably, the lubricating member is also arranged adjacent to the load-carrying surface of the rotating portion 32, herein the outer threaded surface 34 of the screw 33.

The lubricating member 50 is arranged at a minor distance from (i.e. adjacent to) the non-rotating portion 36 as seen in the axial direction A. The lubricating member 50 is arranged at a minor distance from the rotating portion 32 as seen in the radial direction R. The lubricating member is typically arranged in between the rotating portion 32 and the housing 20 as seen in the radial direction R, as shown in FIG. 2.

The lubricating member 50 here has the shape of a bushing 52. However, it should be readily appreciated that in all of the embodiments of the present invention, the lubricating member may not necessarily be a bushing. Accordingly, the lubricating member may be provided in several different forms as long as the lubricating member can include a porous polymeric matrix and a lubricating material while fulfilling the required function of the lubricating member.

In FIG. 2, the bushing 52 is arranged about the rotating portion 32, herein the screw 33. The screw 33 has a threaded outer surface 34. The nut 37 and the bushing 52, respectively, have a threaded inner surface (shown as 38 in FIG. 3 of the nut 37). The threading of the screw 33 and the threading of the nut 37 and the bushing 52, respectively, are generally complementary and typically have the same pitch.

Thus, in order to ensure a smooth operation of the linear actuator, the rotating member 32 should be freely moveable in the axial direction A relative to at least the lubricating member 50. The lubricating member 50 should preferably be rotationally locked to the non-rotating portion 36 in order to ensure said smooth operation including the transfer of the rotational motion of the rotating portion 32 to a linear motion of the piston 10 by means of the non-rotating portion 36. As seen in FIG. 2, the non-rotating portion 36 may include a recess 39 in which at least a portion of the lubricating member 50 may fit. Such as herein shown, the recess 39 typically has the same, or at least a similar, crosscut as the lubricating member 50. Typically, the lubricating member 50 is not load-carrying.

Further, the load-carrying member 60 is shown in FIGS. 2-3. The load-carrying member 60 is arranged at the proximal end 16 of the piston, at least when the piston is in its fully retracted state. The load-carrying member 60 is entirely arranged in the inner milieu 101. As seen in FIG. 2, the load-carrying member 60 is arranged in between the piston 10 and the housing 20 as seen in the radial direction R. The load-carrying member 60 here has the general shape of a sleeve. The load-carrying member 60 surrounds almost the entire periphery of a cross-section of the piston. The load-carrying member 60 is arranged about the piston 10.

The arrangement of the linear electro-mechanical actuator, shown in general in FIG. 1 and more in detail in FIGS. 2 and 3, allows for lubrication of at least a portion of the outer load-carrying surface 34 of the rotating portion 32 by the lubricating material of the lubricating member 50 upon movement of the rotating portion 32.

In all of the embodiments of the present invention, there is provided a linear electro-mechanical actuator which is capable of improving the application of the lubrication in terms of precision and functionality, while providing a precise amount of a lubricating material. In this context, the linear electro-mechanical actuator according to the present invention may not even require relubrication. More specifically, by the arrangement of the linear electro-mechanical actuator as described above, it becomes possible to assemble the actuator easily in a dry state of the lubricating member, i.e. with no smeary grease, or other form of liquid or semi-liquid lubricating material, present except in the porous polymeric matrix of the lubricating member. In addition, the linear electro-mechanical actuator may easily be used due to a relatively controlled consumption of lubricating material causing substantially no leakage of lubricating material as well as due to its tolerance to e.g. washing as well as the linear electro-mechanical actuator may allow for environmentally friendly handling of the lubricating member including the unconsumed lubricating material at end of service life, in particular when provided as a separate member.

REFERENCE NUMBERS 100 linear electro-mechanical actuator
101 inner milieu
102 outer milieu
A axial direction
R radial direction
10 piston
10a part of piston in the inner milieu
10b part of piston in the outer milieu
12 outer load-carrying surface of the piston
14 distal end of the piston
16 proximal end of the piston
18 cross-section of the piston
19 periphery of the cross-section of the piston
20 housing
22 opening being adapted to receive the distal end of the piston
30 transmission module
32 rotating portion
33 screw
34 threaded outer surface (load-carrying surface of the rotating portion)
36 non-rotating portion
37 nut
38 threaded inner surface (load-carrying surface of the non-rotating portion)
39 recess
40 separating member
42 sealing member
44 scraper
50 lubricating member
52 bushing
60 load-carrying member
62 guiding member
70 motor

The invention claimed is:

1. A linear electro-mechanical actuator for transferring a rotational motion to a linear motion comprising:
   a housing defining an inner milieu,
   a piston extending in an axial direction and moveable in the axial direction, the piston having a distal end and a proximal end and moveable relative to the housing,
   a transmission module comprising a rotating portion and a non-rotating portion on the rotating portion and moveable in the axial direction and the non-rotating portion being operatively engageable to the piston, the rotating portion is operatively connected to a motor and has an outer load-carrying surface, the transmission module transfers a rotational motion of the rotating portion generated by the motor to a linear motion of the piston in the axial direction via the non-rotating portion, and
   a lubricating member comprising a porous polymeric matrix and a lubricating material, the lubricating member being present in the inner milieu, and the lubricating member being moveable in the axial direction on the rotating portion and rotationally locked to the non-rotating portion,
   wherein the lubricating member is adjacent to the transmission module, thereby allowing for lubrication of at least a portion of the load-carrying surface of the rotating portion by the lubricating material upon movement of the rotating portion.

2. The linear electro-mechanical actuator according to claim 1,
   wherein the lubricating member is disposed between the transmission module and the non-rotating portion, and due to rotation of the rotating portion, the lubricating member moves axially on the rotating part and lubricates substantially the entire load-carrying surface of the rotating portion with the lubricating material.

3. The linear electro-mechanical actuator according to claim 1, wherein the lubricating member is a separate component of the linear actuator.

4. The linear electro-mechanical actuator according to claim 1, wherein the lubricating member has a hollow tube shape with an annular inner surface.

5. The linear electro-mechanical actuator according to claim 1, wherein the rotating portion is a screw and the non-rotating portion is a nut.

6. The linear electro-mechanical actuator according to claim 1, wherein the rotating portion is a nut and the non-rotating portion is a screw.

7. The linear electro-mechanical actuator according to claim 5, wherein the screw is one of a roller screw, a ball roller screw or a sliding screw.

8. The linear electro-mechanical actuator according to claim 5, wherein the nut is either a rolling element nut or a torsionally locket nut.

9. The linear electro-mechanical actuator according to claim 1, further comprising:
   an opening in the housing allowing the piston to move axially from the inner milieu to an outer milieu;
   a separating member between the piston and the housing in a radial direction and adjacent to the opening of the housing, the separating member separates the inner milieu from the outer milieu.

10. The linear electro-mechanical actuator according to claim 1, further comprising a load-carrying member between the piston and the housing in the radial direction.

11. The linear electro-mechanical actuator according to claim 1, wherein the housing has the shape of a cylinder.

* * * * *